United States Patent [19]
Briscoe et al.

[11] Patent Number: 5,696,961
[45] Date of Patent: Dec. 9, 1997

[54] MULTIPLE DATABASE ACCESS SERVER FOR APPLICATION PROGRAMS

[75] Inventors: Roy A. Briscoe, Haverhill; Robert J. Burke, Northboro; Thomas E. Hanson, Ashland; Paul Holland, Natick, all of Mass.; John M. Moriarty, Nashua, N.H.

[73] Assignee: Wang Laboratories, Inc., Billerica, Mass.

[21] Appl. No.: 653,952

[22] Filed: May 22, 1996

[51] Int. Cl.$^6$ .................................................. G06F 17/30
[52] U.S. Cl. ............................................ 395/602; 395/601
[58] Field of Search ........................... 395/600, 80, 604, 395/614, 615, 161, 800, 602, 601; 364/200, 401

[56] References Cited

U.S. PATENT DOCUMENTS

| | | | |
|---|---|---|---|
| 4,394,731 | 7/1983 | Flusche et al. | 364/200 |
| 4,476,524 | 10/1984 | Brown et al. | 364/200 |
| 5,210,870 | 5/1993 | Baum et al. | 395/600 |
| 5,297,279 | 3/1994 | Bannon et al. | 395/600 |
| 5,301,105 | 4/1994 | Cummings, Jr. | 364/401 |
| 5,437,027 | 7/1995 | Bannon et al. | 395/600 |
| 5,446,881 | 8/1995 | Mammel, Jr. | 395/600 |
| 5,524,202 | 6/1996 | Yokohama | 395/161 |
| 5,530,883 | 6/1996 | Baum et al. | 395/800 |
| 5,537,603 | 7/1996 | Baum et al. | 395/800 |
| 5,537,604 | 7/1996 | Baum et al. | 395/800 |
| 5,537,622 | 7/1996 | Baum et al. | 395/800 |
| 5,542,087 | 7/1996 | Neimat et al. | 395/600 |
| 5,542,089 | 7/1996 | Lindsay et al. | 395/600 |
| 5,548,769 | 8/1996 | Baum et al. | 395/800 |
| 5,551,028 | 8/1996 | Voll et al. | 395/600 |
| 5,590,362 | 12/1996 | Baum et al. | 395/800 |

*Primary Examiner*—Thomas G. Black
*Assistant Examiner*—Frantz Coby
*Attorney, Agent, or Firm*—Ronald J. Paglierani; Gary D. Clapp

[57] ABSTRACT

A method and apparatus for providing access to database data by applications programs executing on a computer system wherein a database bucket mechanism is interposed between one or more application programs and one or more databases. The bucket mechanism is comprised of an applications interface communicating with each of the applications programs in their native modes and a bucket engine generating "buckets" containing "bucket objects". Each bucket represents a group or class of database data members and contains one or more bucket data objects containing members of the databases, a database object mapping the bucket data object to the databases and an access object containing methods for accessing the databases in their native modes. Buckets and bucket data objects are constructed by the bucket engine according to information stored in an object map and a table map.

12 Claims, 9 Drawing Sheets

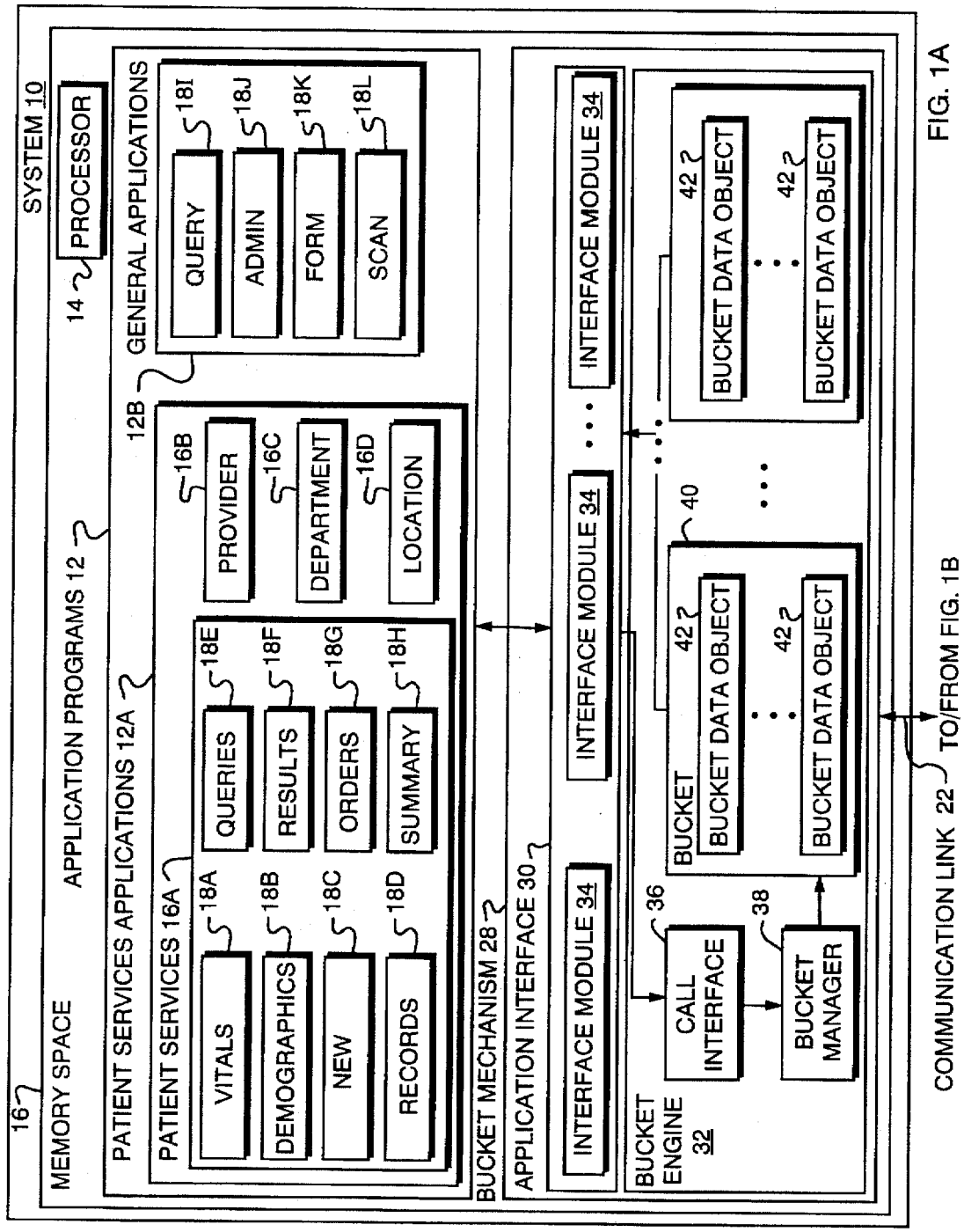

PROPERTIES 72

Bucket Type: 72a
Patient
Provider          Session
Dept              Dictionary
Location
Organization
Admin
Misc

Bucket Object: 72b
Bucket Object To Use.

Bucket Action: 72c
Delete              Get Buckets
Insert              Get Objects
Select              Get Members
Update              Get Methods
Connect             Doc_InsertPage
Disconnect          Doc_AddPage
Add UIMember        Add Member
Add Condition       Add Sort
Clear               Clear Cache

Bucket Object Member: 72d
Members depend on which object is selected

Bucket Object Member Data:
Member's Data (from the database) 72e

Bucket Object Member Type:
Members Type (from the map) 72f

Bucket Object Member Length:
Members Max Length (from the map) 72g

UI Type: 74a
None (Default)    Combo Box
ListBox           Grid
Drop Down List

UI Member: 74b
Member(s) to display in U

UI Delimiter: 74c
Delimiter between columns

UI Row: 74d  UI Col: 74e
Row of UI       Column of UI

UI MaxRows: 74f
Max Rows

UI Text: 74g
Text to put in UI row and col or text from UI row and col.

Sort: 78a
Ascending (default)
Descending

Sort Member: 78b
Object member to perform sort on.

Condition Operator: 80a
<, >, =, like

Condition Member: 80b
Object member to apply condition to.

Condition Text: 80c
Text for condition compare. date > 3/31/95, descrip like choler

FIG. 4A

PROPERTIES 72

| Row: 82 | Col: 84 |
| Data Row | Data Column |

MaxRows: 86
MaxRows of Data

MaxCols: 88
MaxColumns of Data

Status: 90
Status results of an Action.

Status String: 92
String corresponding to the Status.

SQLStmt: 94
SQL statement to be used.

Cache Type: 96
Until next request (default)
File

Cache Duration: 98
Rules for keeping cache

Cache Max data objects: 100
Max number of data objects

Default Member: 102
Object member to perform sort for default display row.

Default Text: 104
Text to search on for default display.

FIG. 4B

MULTIPLE DATABASE ACCESS SERVER FOR APPLICATION PROGRAMS

CROSS REFERENCES TO RELATED APPLICATIONS

FIELD OF THE INVENTION

The present invention relates to an apparatus and method for database access and, more particularly, to a method and apparatus for providing database access services to multiple applications programs.

BACKGROUND OF THE INVENTION

A primary feature of the development of computer systems and applications programs in recent years has been the increasing degree of interoperability between applications programs and, in particular, the degree to which applications programs can communicate and share data. It is now commonly expected that a given application program will be able to communicate and exchange data, and even calls for functional operations, with a number of other programs and a number of different approaches have been developed to provide such interoperability. One of the earliest approaches, for example, was the development of suites of applications programs, such as Lotus 1-2-3, that effectively comprised a single application program with an extensive array of functions, such as word processing, spreadsheets, databases and communications. A later approach was the development of operating systems, such as Microsoft Windows, that provided an integrated operating environment wherein applications programs that conformed to the environment are thereby able to exchange and integrate data between themselves.

A recurring problem in achieving integration between applications programs, however, is that it is often difficult or impossible, for many different practical reasons, such as economics or competitive efforts, to design programs to operate together directly. Although integrated operating environments offer some solutions for these problems, the problem remains because not all designers choose to fully conform with the operating environment. Even when applications programs do fully conform with an integrated operating environment, however, the results have been unsatisfactory because the degree and type of integration between applications programs is dictated by the operating environment, which may not provide the integration facilities required in a particular instance and which, in fact, may merely interpose additional interfaces and mismatches to be overcome. Further, the degree and types of integration provided by integrated operating environments are dictated by the operating environments, which are designed to provide only generalized integration facilities usable by a wide range of applications programs. As such, the data integration facilities of integrated operating environments often do not meet the needs of a particular application program or user and the user or application program is forced to adapt to the integrated operating environment, rather than the operating environment adapting to the user or application program.

This problem has been particularly acute with regard to interfacing between applications programs and databases, although it is a common feature in many systems that many of the applications programs executing therein will obtain the data that they work with from one or more common databases of different types. While the prior art has offered many approaches to the problem of database access by applications programs, these approaches have been generally unsatisfactory. Many, for example, depend upon the applications programs and the database programs being originally designed to work together, which is often not possible as the applications programs and databases are designed a different times and by different developers, or depend upon the facilities provided by an integrated operating environment, with the limitations and problems described above.

Still other solutions of the prior art have provided translation interfaces to be interposed between the applications programs and the database programs. These approaches have likewise been generally unsatisfactory, however, as they have required modifications to either the applications programs or the database programs and have thereby required that either applications programs or the database programs have knowledge of the data and command formats and functions of the other program. These approaches are further unsatisfactory in that the translations interfaces are generally specific to a given application or database program or set of programs and it is frequently difficult to adapt the translation interface to additional applications programs or database programs.

Still other approaches of the prior art include what are referred to as "rapid application development" (RAD) tools that provide programmatic interfaces to databases, such as Microsoft's Visual Basic or Borland's Delphi programs. These approaches have been unsatisfactory, however, in many instances because, while the user is not required to be concerned with the detailed "back end" of database processing, that is, the actual creation of Sequential Query Language (SQL) statements, the user is still required to have detailed knowledge of the database design, such as the tables, the table columns, the relationships between tables, and what groups of tables comprise a "data object".

The present invention provides a solution to these and other problems of the prior art.

SUMMARY OF THE INVENTION

The present invention is directed to a method and apparatus for providing access to database data by applications programs executing on a computer system including a processor for operating on the data and a memory for storing the applications programs and data extracted from the databases. According to the present invention, a database bucket mechanism is interposed between one or more application programs and one or more databases and functionally insulates the applications programs from the databases so that neither the applications programs or the users thereof need have knowledge of the internal structures or mechanisms of the databases.

The database bucket mechanism is comprised of an applications interface communicating with each of the applications programs in their native modes and a bucket engine generating "buckets" containing "bucket objects" that communicate with the databases in their native modes. Each bucket represents a group or class of database data members, as defined by the applications programs, and contains the information necessary to construct bucket objects which contain subsets of the data members belonging to a bucket class, again as defined by the applications programs, and the corresponding methods, or programs, necessary to execute database operations.

Individual buckets and bucket objects are constructed by the bucket engine according to information stored in an object map and a table map that relate the data structures and queries of the applications programs to the data structures and operations of the databases. The bucket mechanism is thereby comprised of a general purpose database access mechanism, the bucket engine, and a separable library of bucket definition information, the object maps and map tables, to tailor the bucket mechanism to specific applications programs and databases in a manner that is transparent to the application programs and the users thereof.

The present invention is therefore directed to a bucket mechanism connected between applications programs executing on a computer and a database for providing access to database data by the applications programs, and the method of installation and operation of the bucket mechanism and the components thereof. According to the present invention, the bucket mechanism includes a bucket engine connected from the application programs and to the databases and being responsive to database requests from the application programs for generating corresponding buckets wherein each bucket corresponds to a class of data members of the databases requested by an application program. Each bucket, in turn, includes a bucket data object for storing data members retrieved from the database wherein each bucket data object corresponds to a related group of data members retrieved from the database in response to a database request and a database access object for holding and executing database access methods and responsive to a database request for retrieving the requested data member from the database and storing the requested data member in a corresponding bucket data object. According to the present invention, the bucket engine is responsive to a database request for providing the requested data member stored in the corresponding bucket data object to the applications programs.

Further according to the present invention, each bucket further includes a database object connected between a bucket data object and a database access object for mapping a received database request to a database access method of the database access object and indicating to the database access object the database access method corresponding to the received database request.

The bucket mechanism may also include an application interface connected between the applications programs and the bucket engine and communicating with the applications programs in their native modes for receiving database queries from the application programs and generating corresponding database access requests to the bucket engine.

In a further aspect of the present invention, the bucket engine also includes an application object for executing bucket engine operations in response to database requests from a corresponding application program, including initiating a bucket engine database operation for and corresponding to each database request generated by the corresponding application program.

In still futher aspects of the present invention, the bucket mechanism includes an object map and a table map for storing information for use by the bucket engine in constructing buckets and bucket data objects. According to the present invention, the table map includes a table for and corresponding to a database table, wherein each table includes an identification of the corresponding database table, and a member map for each member of the corresponding database table appearing in the bucket data object. Each member map, in turn, includes an identification of the member, an identification of the database column containing the member, and an identification of the data type of the member. The object map includes an object map object for and corresponding to each bucket data object wherein each object map object includes a table list of table instructions for and corresponding to each table appearing in a table of the table map and an object member map. According to the present invention, each table instructions includes a table name identifying the corresponding table in the table map, an insert order defining the order in which the tables are inserted into or deleted from membership, and join conditions defining how the member tables are joined. The object member map includes a concatenated list of all database members of the bucket data object.

DESCRIPTION OF THE DRAWINGS

The foregoing and other objects, features and advantages of the present invention will be apparent from the following description of the invention and embodiments thereof, as illustrated in the accompanying figures, wherein:

FIG. 4 is a diagrammatic representation of application interface properties of the present invention;

DESCRIPTION OF THE INVENTION

1. General Description (FIG. 1)

Figure 1B:
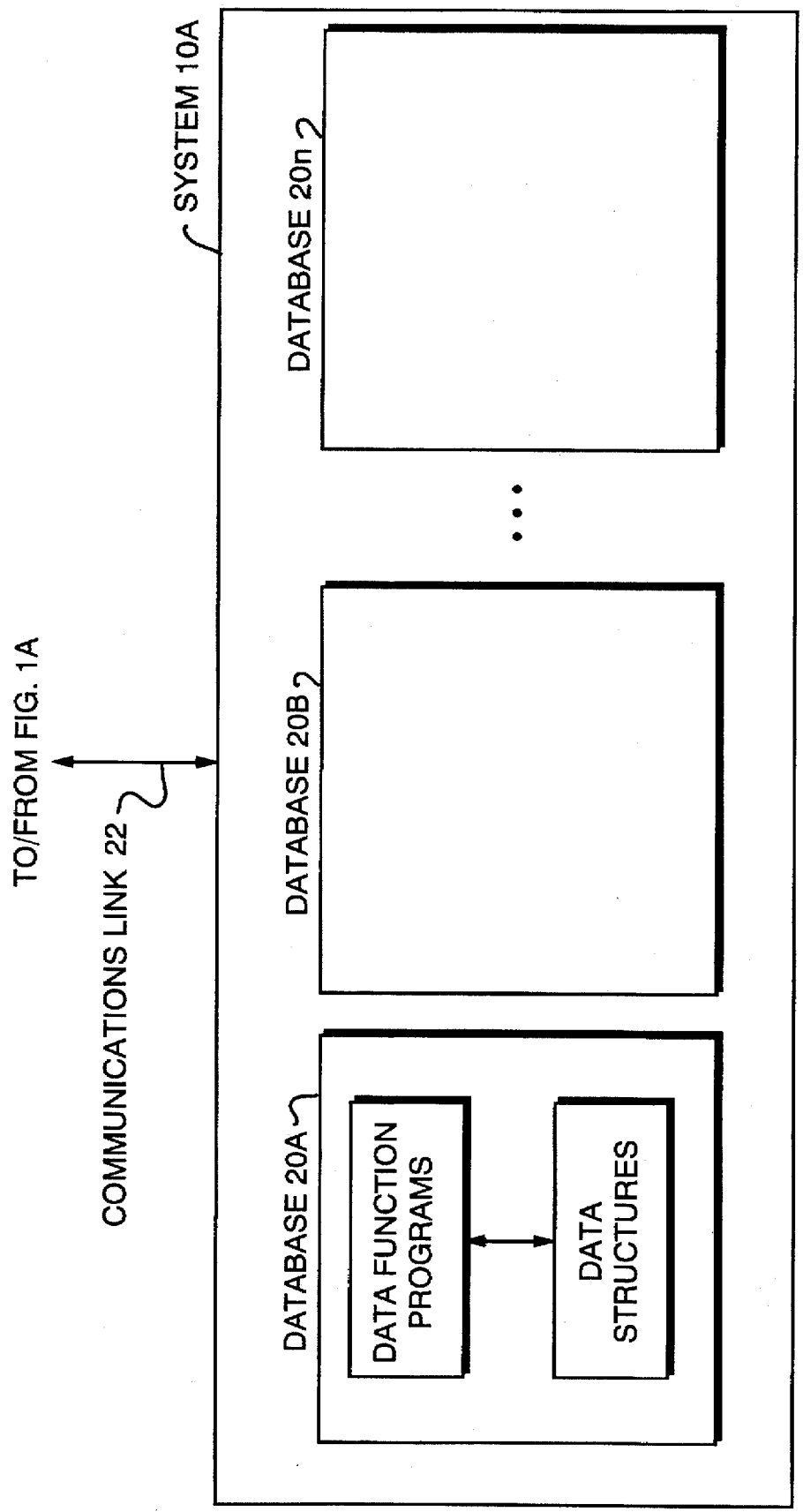
FIG. 1 is a diagrammatic representation of a system incorporating the present invention.

Referring to FIG. 1, therein is shown a diagrammatic block diagram of the present invention as implemented in a System 10, which is typically a personal computer or, in the alternative, a mini or mainframe computer with a plurality of workstations, and wherein a plurality of Applications Programs 12 are executing on a Processor 14 and in the Memory Space 16 of System 10 and access Databases 20 to read data from and write data to Database 20.

In a present exemplary implementation of System 10, System 10 may, for example, be a medical administration System as might be used in a hospital, clinic or medical office, but may be any system having an application program or programs accessing databases. In this example, however, and by way of illustration, Applications Programs 12 may include Patient Services Applications 12A as well as General Applications 12B. Patient Services Applications 12A may, for example, include such applications as Patient Information Applications 16A, Provider Applications (Provider) 16B, Clinic Applications (Department) 16C and Facility Applications (Location) 16D wherein these applications may be implemented as separate applications or as functional components of an integrated medical services application. Patient Information Applications 16A may, in turn, include applications programs or utilities for entering, displaying and managing or editing such information as patient vital signs (Vitals) 18A, patient demographics (Demographics) 18B, a utility for generating a new patient transaction or action or to enter a new type of information (New) 18C, Patient Records (Records) 18D, Patient Queries (Queries) 18E, patient Laboratory Results (Results) 18F, Treatment and Medicine Orders (Orders) 18G and Summarized Information (Summary) 18H. General Applications 12B, in turn, may include an Ad Hoc Query Engine (Query) 18I for formulating queries to the database and displaying the results of such queries, Administrative Programs and Functions (ADMIN) 18J, a form building program (Form) 18K and a document scanner (SCAN) 18L. As will be apparent to those of skill in the relevant arts, General Applications 12B may include still further applications programs, such as word processing programs, spreadsheet programs, graphics programs, electronic mail programs.

Database 20, in turn, may be comprised of one or more Databases 20A, 20B, . . . 20n and may reside on System 10 or on a System 10A or a plurality of Systems 10A connected to System 10 through a Communications Link 22, such as a Wide Area Network or a Local Area Network. In other embodiments, however, and as well understood by those of ordinary skill in the relevant arts, one or more of Databases 20A–n may reside in System 10, for example, wherein System 10 is personal computer (PC), a minicomputer or a mainframe computer, while others may reside on one or more Systems 10A. As indicated in FIG. 1, each Database 20 will generally include the Data Structures 24 for storing the data and a plurality of Data Function Programs 26 for accessing, reading, writing, and managing Data Structures 24.

As discussed previously, each of Databases 20A–n will generally have been designed to accept database commands or queries in formats and syntaxes that may be particular to each database and to accept and provide data in formats and syntaxes that may be particular to each database. According to the present invention, the internal structures and functional elements of Databases 20A–n are not modified in any way and Databases 20A–n are not functionally aware of particular operations of the sources of requests for database operations or of the sources or destinations of data. Each of Databases 20A–n will instead receive database commands or queries in the formats and syntaxes particular to the database and will accept and provide data in the formats and syntaxes particular to the database.

Further according to the present invention, each of Applications Programs 12 likewise will generally have been designed to generate database related requests, calls or commands in formats and syntaxes that may be particular to the application program, and to accept and provide data in formats and syntaxes that may be particular to the application program. According to the present invention, the internal structures and functional elements of Applications Programs 12 are not modified in any way and Applications Programs 12 are likewise not functionally aware of the particular operations of the destinations of requests for database operations or data or the sources of data. Instead, each of Applications Programs 12 will generate database related requests in the formats and syntaxes particular to the application program and will receive and provide data in the formats ands syntaxes particular to the application program.

According to the present invention, therefore, each of Applications Programs 12 and Databases 20A–n is fully and completely functionally insulated from the other and neither of Applications Programs 12 or Databases 20A–n is modified in any way to operate together. Each of Applications Programs 12 and Databases 20A–n operates in its native manner and mode, and to receive and provide commands, requests and data as if interfaced with, respectively, a database or application program tailored to its particular operations and interfaces.

2. General Description of Bucket Mechanism 28 (FIG. 1)

According to the present invention, the operational bridge or interface between Applications Programs 12 and Databases 20A–n that insulates Applications Programs 12 from Databases 20A–n while providing full database functionality to Applications Programs 12 is provided by Bucket Mechanism 28, which includes an Application Interfaces 30 and a Bucket Engine 32. As will be described in further detail below, Application Interfaces 30 is a functional interface between Applications Programs 12 and Bucket Engine 32, communicating with Applications Programs 12 according to their native formats and syntaxes, while Bucket Engine 32 executes the database requests with respect to Databases 20A–n, communicating with Databases 20A–n according to their native formats and syntaxes.

Bucket Mechanism 28 thereby effectively provides a "middle layer" between Applications Programs 12 and Databases 20A–n that frees the user, that is, Applications Programs 12, from having to have knowledge of the designs of Databases 20A–n and of the specific syntaxes, formats and protocols for performing database operations. As will be described below, Bucket Mechanism 28 uses database object and map table mechanisms, which are essentially series of instructions for any given database object for any given database, to perform database operations in response to requests, commands and queries in the native terms of Applications Programs 12.

As will be described in detail in the following, Bucket Mechanism 28 provides the programmer and user with a simple interface to Databases 20A–n that groups the databases into logical categories called "buckets", which are large groups of classes of database tables, that contain "bucket objects", which are small groups of database tables, and "members", which are database table columns or a group of database columns.

In addition to providing an interface to Applications Programs 12, and thus to the programmer and user, Bucket Mechanism 28 allows the construction of ad hoc query tools as the bucket, bucket object and member mechanism provide a link between the query tool and the databases wherein the user or programmer is not required to have knowledge of the databases. Bucket Mechanism 28 also allows the generation of database data groupings that are not usual in database operations, such as grouping by current date, current time and aging.

As will also be described further below, Bucket Mechanism 28 further provides flexibility in where the major components of Bucket Mechanism 28 reside in a system. Considering the data path to consist, from "top" to "bottom", of Applications Programs 12, the data extracted from the databases, the Sequential Query Language (SQL) queries, and the database, the mechanisms of the present invention may be implemented in a standalone system wherein the Application Programs, data, SQL queries, and database reside in a single system, such as a desktop or laptop system or a single minicomputer or mainframe computer. Likewise, the present invention can be implemented in several forms in client/server systems, for example, wherein the Applications Programs 12, the data and the SQL queries reside on a client and the databases reside on a server, or wherein the Applications Programs 12 and the data reside on a client while the SQL queries and databases reside on a server, or wherein the Applications Programs 12 reside on a client and the data, SQL queries and databases reside on a server.

In a presently preferred embodiment of the present invention, Application Interfaces 30 and Bucket Engine 32 are implemented using object oriented programming techniques executing in the Microsoft Windows operating environment. The following descriptions will therefore assume Microsoft Windows as the operating environment for the present invention, together with the functionality and capabilities of Microsoft Windows, and will conform to the conventions of object oriented programming and the Microsoft Windows operating environment in describing the present invention. The functionality and capabilities of Microsoft Windows are well known to those in the relevant arts and is well described in readily available publications, such as "Windows 3.1 Programmer's Reference" by James W. McCord and published by Que Corporation and "Inside OLE 2" by Kraig Brockschmidt and published by Microsoft Press, as are the techniques, methods and facilities for object oriented programming. Those of skill in the relevant arts will therefore readily understand from the following description of the present invention how to implement the present invention, as well as how to adapt the present invention to other operating system environments, such as New Wave, Macintosh[1] and UNIX.

[1]Macintosh is a trademark of Apple Computer Corporation.

First considering Application Interfaces 30 and Bucket Engine 32 on a general level and as illustrated in FIG. 1, Application Interfaces 30 receives requests, commands or calls, hereafter generically referred to as "requests", for database operations from Applications Programs 12, each in the format and syntax native to the requesting Applications Program 12, and, as described in the following, transforms each such request or command into one or more interface calls to Bucket Engine 32. Application Interfaces 30 also includes the facilities and functions to create, manage and execute certain user interface functions related to database operations. As indicated in FIG. 1, therefore, Application Interfaces 30 includes an Interface Module 34 for and corresponding to each type of Applications Program 12 wherein a type of Applications Program 12 may include one or more Applications Programs 12 which share a common database operation syntax and format, or a set of database syntaxes and formats that may be included within a single Interface Module 34.

Bucket Engine 32, in turn, communicates and operates with each of Databases 20A–n in the formats and syntaxes native to the Databases 20A–n to perform the requested operations. Bucket Engine 32 receives the results of each database operation from Databases 20A–n, again in the formats and syntaxes native to the Databases 20A–n, and communicates and operates with Application Interfaces 30 to return the results of each requested operation to the requesting Applications Program 12.

Figure 2:
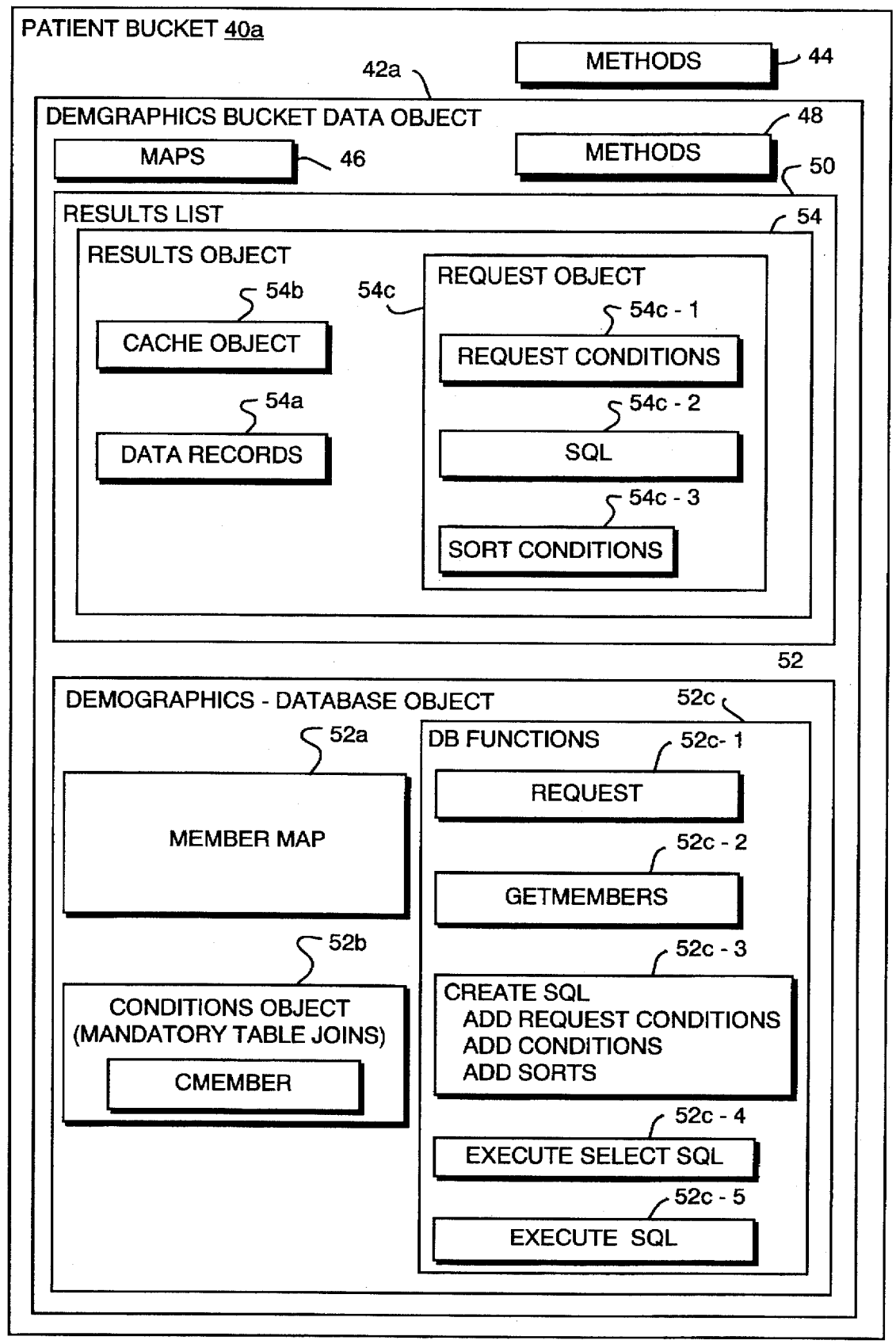
FIG. 2 is a diagrammatic representation of a bucket and bucket object of the present invention.

3. Buckets 40 and Bucket Data Objects 42 (FIGS. 1 and 2)

In the present implementation, Bucket Engine 32 is implemented as a dynamic linked library (dll) that includes a Call Interface 36 to Application Interfaces 30 and a Bucket Manager 38 to create Buckets 40 and Bucket Data Objects 42 as required. According to the present invention, and in conformity with object oriented programming techniques, a Bucket 40 corresponds to a class or grouping of related information while a Bucket Data Object 42 is a member of a Bucket 40 class and contains information belonging to that class or grouping of related information. Stated another way, a Bucket 40 is a logical grouping of database information which creates a multi-level hierarchy of Bucket Data Objects 42 from a relational database, such as one of Databases 20A–n. For example, and as will be described in the following, in the present exemplary System 10 Bucket Manager 38 will create Buckets 40 corresponding to the classes or groupings of information previously identified with respect to Patient Services Applications 12A as Clinic, Facility, Provider and Patient information. Bucket Manager 38 will also create buckets corresponding to each of the application programs or types of information used by the General Applications 12B that perform database operations.

As will be described in the following, Bucket Manager 38 will create Buckets 40 and Bucket Data Objects 42 through 42n for use with any type of Database 20, that is, with any database syntax and format known to Bucket Manager 38 and, for this purpose, stores information relating to the construction of Buckets 40 and Bucket Data Objects 42 for each type of Database 20 currently known to Bucket Manager 38. In this regard, and as also described below, new types of databases and bucket objects may be easily added to Bucket Manager 38.

For purposes of data integrity, the present implementation of the present invention creates and maintains a single instance of Bucket Engine 32, and thus of Bucket Manager 38, on a System 10 at any given time, and one copy of each Bucket Data Object 42 on a System 10 at any given time. All Applications Programs 12 executing on the System 10 and all functions of those Applications Programs 12 will thereby access Databases 20 through the single instance of Bucket Engine 32 and Bucket Manager 38 and will access the single copy of a given Bucket Data Object 42.

Further in this regard, Bucket Manager 38 will create Buckets 40 and Bucket Data Objects 42 when information is requested from or written to a Bucket 40 and a Bucket Data Object 42 by an Applications Program 12 and will create new Buckets 40 or Bucket Data Objects 42 only when a new Bucket 40 or Bucket Data Object 42 is necessary to meet the requirements of a particular database request.

Buckets 40 and Bucket Data Objects 42 are thus created dynamically and there can be a virtually unlimited number of different types of Buckets 40 and Bucket Data Objects 42, depending upon the needs of Applications Programs 12 and the number and types of Databases 20A–n. As such, the present implementation does not store or hard code specific instances of Buckets 40 or Bucket Data Objects 42, but instead maintains a Bucket 40 object class and a Bucket Data Object 42 object class and, when a Bucket 40 object or a Bucket Data Object 42 object is created, it is initialized with an instruction set, or set of methods, which define what the object is and how it behaves.

Bucket 40 objects, are therefore initialized with the instruction set "Objects", reflecting that the function of Buckets 40 is to create and manage and operate upon Bucket Data Objects 42. Bucket Data Objects 42 are, in turn, initialized with the instruction sets instructions sets and table maps, as will be defined below. As will be described in further detail below, the instruction sets and table maps define the structures and functions of Bucket Data Objects 42 and the interrelationships of the structures and functions of Bucket Data Objects 42 with the data structures and database operations of Databases 20A–n and the user. The instruction sets and table maps thereby reflect and define the correlation between the characteristics and properties of a particular Bucket Data Object 42 type, a particular corresponding Application Program 12 and a particular Database 20. It will therefore be apparent, as from the previous descriptions of the present invention, that there can be a Bucket Data Object 42 type for each pairing of an Application Program 12 and one of Databases 20A–n. Finally, the table maps and instruction sets define the initial mandatory and selected characteristics and operations of the Bucket Data Object 42 and the hierarchical relationships between Bucket Data Objects 42 within a given Bucket 40 class.

The relationship of Buckets 40 and Bucket Data Objects 42 is further illustrated in FIG. 2, which shows a Bucket 40a of the class Patient and corresponding to a particular patient. Bucket 40a is illustrated therein as containing a Bucket Data Object 42a of a class Demographics and a Database Object 52 defining database members appearing in Bucket Data Object 42a and the relationship between Bucket Data Object 42a and the data structures and database operations of Databases 20A-n. As will be described in the following, and according to the present invention, each Bucket 40 or Bucket Data Object 42 may contain further Bucket Data Objects 42 in a hierarchical relationship of Bucket Data Objects 42 defined for a particular Application Program 12 and Database 20 by the information stored in Bucket Manager 38.

As illustrated in FIG. 2, and as will be described in further detail in following descriptions, a Bucket 40, such as Patient Bucket 40a, contains a set of Methods 44 defining operations that may be performed by the Bucket 40 object, such as creating Bucket Data Objects 42, a Maps 46 for holding information relating the Bucket 40 to Databases 20A-n, and, in this example, a Demographics Bucket Data Object 42a. Demographics Bucket Data Object 42a, in turn, and as representative of Bucket Data Objects 42, contains a set of Methods 48 defining operations that may be performed by the Bucket Data Object 42, a Results List 50, and a Database Object 52 for holding methods, conditions and functions for accessing Databases 20A-n.

As also illustrated, and as typical of Results Lists 50 of Bucket Data Objects 42, Results List 50 contains a Results Object 54 which includes Data Records 54a for holding a record of the results of a database operation, for example, as a character string containing data from the included members of Databases 20A-n, and a Cache Object 54b for holding information pertaining to the Bucket Data Object 42a for subsequent use, such as the extracted Database 20A-n data or the conditions and methods to be used in creating the Bucket Data Object 42a, and information identifying where in System 10 the cached information is stored. A Results Object 54 further includes a Request Object 54c for storing the request generated by an Applications Program 12 that resulted in the creation of the Bucket Data Object 42. As shown, a Results Object 54 includes a Request Conditions 54c-1 for storing information pertaining to the request, such as a patient identification, a SQL 54c-2 for storing the SQL query comprising the request, if the user provided an SQL query as a request, and a Sort Conditions 54c-3 for storing information provided in the request regarding how the database results are to be sorted in responding to the request.

Demographics Database Object 52, in turn, and as illustrative of Database Objects 52, includes a Member Map 52a for holding information defining the members, or data, of Databases 20A-n that are to appear in the Bucket Data Object 42, for example, in Data Records 54a and a Conditions Object 52b for holding mandatory defining relationships between information in the Bucket Data Object 42a and information in the Databases 20A-n.

Demographics Database Object 52 further includes a Database (DB) Functions 52d, which generally includes the methods to be used for performing database operations, such as insert, update, delete, and so on. As indicated in FIG. 2, the DB Functions 52c of a Database Object 52 includes a Request 52c-1, which identifies the original request that resulted in the creation of the Bucket Data Object 42, a Getmembers 52c-2, including the methods for selecting and incorporating members, that is, Database 20A-n information, that is to be contained in the parent Bucket Data Object 42a, and the methods to be used for performing database operations, such as insert, update, delete, and so on. DB Functions 52c further include a Create SQL 52c-3 containing information for creating an database query, an Execute Select SQL 52c-4 for creating the database query statement, such as an SQL statement, and an Execute SQL 52c-5 for accessing Databases 20A-n.

As will be apparent, a Bucket 40 may include still further Bucket Data Objects 42 containing further groups or types of information. For example, a Patient Bucket Data Object 42a may also have Bucket Data Objects 42b-n corresponding to Provider(s) 16B, patient Vitals 18A, patient Orders 18G and Lab Results 18F, as discussed previously with regard to Patent Applications 12A. Likewise, it will be apparent that a given Bucket Data Object 42 such as a Demographics Bucket Data Object 42a may contain different numbers and types of subsidiary Bucket Data Objects 42, depending upon the particular design, implementation and purpose of a particular Bucket Data Object 42 or System 10.

4. Detailed Descriptions

A. Bucket Mechanism 28 (FIG. 3)

Figure 3:
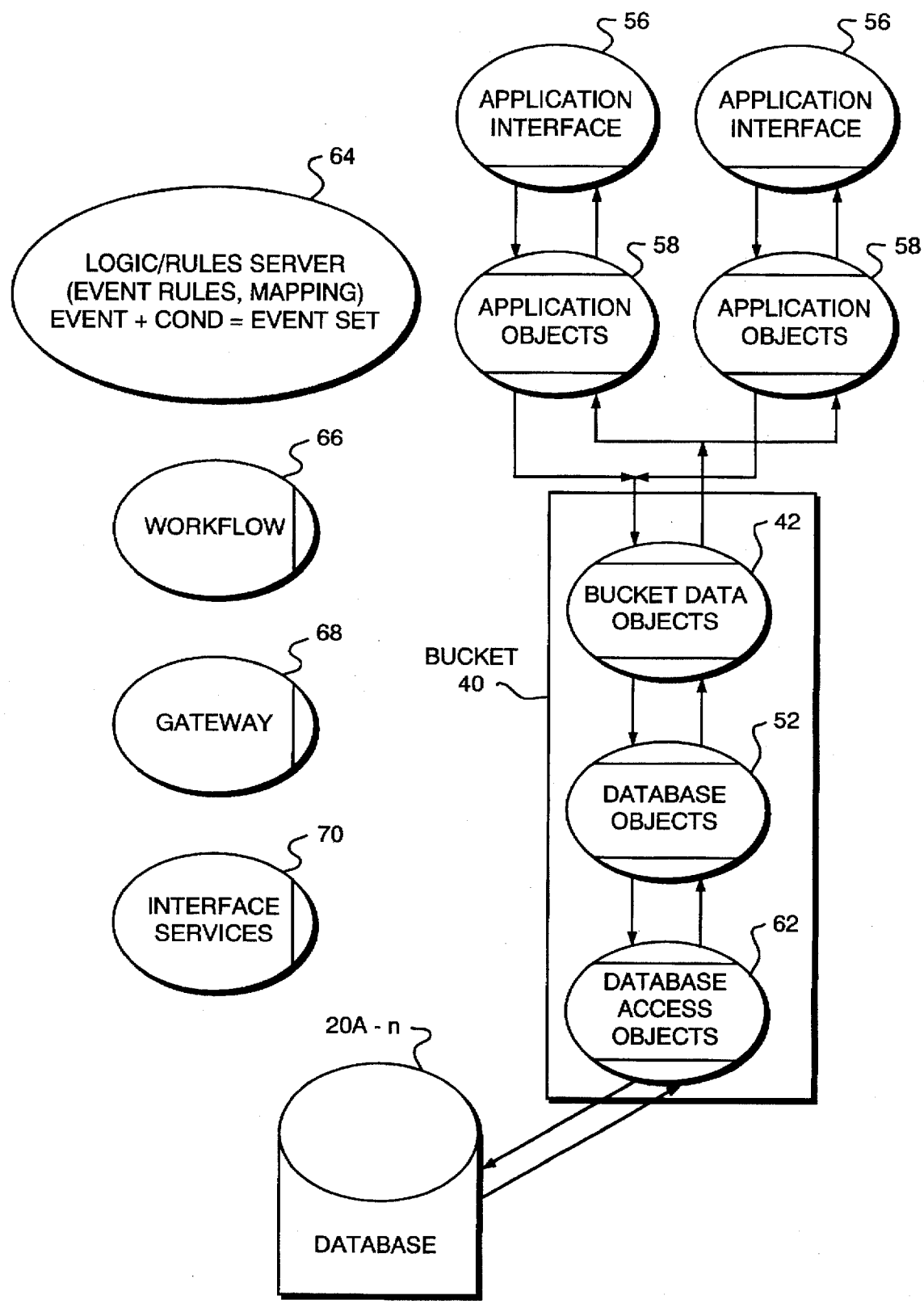
FIG. 3 is a diagrammatic object based representation of the present invention.

Referring now to FIG. 3, therein is shown a further diagrammatic representation of Bucket Mechanism 38 of the present invention as implemented in an object oriented system.

As illustrated therein, Bucket Mechanism 38 of the present invention includes Application Interfaces 30 of FIG. 1 and are the interfaces for each of Applications Programs 12. Application Interfaces 30, in turn, interface with corresponding Application Objects 58, which execute logic, methods and operations in support of a corresponding Application Interfaces 30. In general, there will be at least one Application Object 58 for each Application Interfaces 30 and an example of an Application Object 58, using the present example of a medical services system, would be an appointment list. As will be described below, a given Application Object 58 will in turn have one or more associated data objects, such as one or more patient data objects and one or more provider data objects.

As indicated in FIG. 3, a Bucket 40 contains one or more Bucket Data Objects 42 wherein each Bucket Data Object 42 interfaces with Application Objects 58 to hold, manage and cache data for each Application Program 12. As indicated in FIG. 3, multiple instances of Applications Programs 12 and corresponding Application Interfaces 30 and Application Objects 58 may simultaneously share and access a single Bucket Data Object 42 and, while multiple instances of a given Bucket Object 42 may exist across the system in a variety of topologies, there will be only one instance of a given Bucket Data Object 42 within a system. A given Bucket Object 42 may, however, contain more than one results object, that is, instance of real data, and Application Objects 58 can "talk" to more than one Bucket Data Object 42.

As also illustrated in FIG. 3, Buckets 40 further include Database Objects 52 interface with Application Objects 58 and Data Access Objects 62, to map the Bucket Data Objects 42 to various data access methods, such as SQL query generation programs and utilities in Database Access Objects 62 and to members of Databases 20A-n.

Database Access Objects 62 of a Bucket 40, in turn, interfaces with the Databases 20A-n and accesses the databases and returns the results to Database Objects 52 and thus to the requesting Bucket Data Objects 42 and the requesting Applications Programs 12.

It will be noted in FIG. 3 that there are a number of components of the bucket mechanism of the present invention that are represented as not being connected in the direct data path from Application Interfaces 30 and through Application Objects 58, Bucket Data Objects 42, Database Objects 52 and Database Access Objects 62 to Databases 20A-n. These components include Rules Server 64 which contains the application logic and business rules and methods that can be separated from the user interface and shared across multiple instances of a given application program or across multiple applications programs. In the system of the present invention, multiple Rules Servers 64 can be supported in a given system wherein each Rules Server 64 may support a different functional grouping of Applications Programs 12 or users, such as different departments or system users. Rules Server 64 would usually be accessed from Applications Objects 58 or from, for example, Gateway 68, described below.

Workflow Component 66, in turn, performs similar tasks as Rules Server 64, but supports workflow processes in the system. The division between Workflow Component 66 and Rules Server 64 depends upon the particular capabilities and functions of Workflow Component 66 and Rules Server 64 as implemented in the system.

Lastly, Gateway 66 supports communications between the bucket mechanism and outside Applications Programs 12 and other data repositories while Interface Services 70 comprises an interface component and set of interface object classes used within the bucket mechanism components to facilitate communication between the bucket mechanism components. The services provided by Interface Services 70 includes supporting named services across networks as well as local interface services, such as communication between dynamic linked libraries.

Finally, it will be noted in FIG. 3 that each object therein is represented by an oval enclosure with the communications between objects represented by lines connecting certain of the objects. It will also be noted that certain of the object boundaries wherein the communications lines connect to the objects are marked off from the body of an object by an additional line within the object boundaries. These marked off points of connection indicate functional and operational boundaries, or borders, whereat the objects may be physically and functionally separated from one another, for example, with one object at one end of a communication connection residing on one physical or functional component of the system, such as a client, and the object at the other end of the communication connection residing on a different physical or functional component of the system, such as a server. It is therefore apparent, as earlier discussed, that the physical and functional topology of the system of the present invention is readily adaptable to a wide variety of different physical, geographic and functional topologies.

B. Application Interfaces 30 (FIGS. 1, 3 and 4)

As described with reference to FIG. 1, Application Interfaces 30 is comprised of a plurality of Interface Modules 34 wherein there is an Interface Module 34 for and corresponding to each type of Applications Program 12 that performs database operations. Each Interface Module 34 of Application Interfaces 30 receives requests for database operations from the corresponding Applications Program 12 or Applications Programs 12, each request being in the format and syntax native to the requesting Applications Program 12, and transforms each such request or command into one or more interface calls to Bucket Engine 32. The Interface Module 34 that receives a request for a database operation from an Applications Program 12 then receives the results of the request, if any, from Bucket Engine 32 and returns the results to the requesting Applications Program 12. As also described, Application Interfaces 30 further includes the facilities and functions to create, manage and execute certain user interface functions related to database operations.

As described with reference to FIG. 3, Application Interfaces 30, like Bucket Engine 32, is presently implemented in an objected based system as a library of programs, utilities and functions that are used in common to perform the operations of Interface Modules 34 and is thereby best described in terms of the properties and characteristics of the requests and Bucket Engine 32 calls dealt with by Application Interfaces 30.

Referring to FIG. 4, therefore, therein is illustrated certain of the Properties 72 dealt with by Application Interfaces 30. As represented therein, these properties may include a plurality of User Interface Properties (UIs) 74a–g, each of which defines one or more properties of the user interface, as indicated by the entries in the illustrated UIs 74a–g.

Others of Properties 68 include Buckets 76a–g pertaining to and defining aspects of Bucket Data Objects 42, such as the type and identification of a bucket object, the action requested, and the member, that is, database column, and database data, type and length involved in or resulting from the request.

Still others of Properties 68 pertain to and define the mandatory or selectable conditions of the Bucket Data Object 42, such as Sort 78a–b pertaining to sorting or ordering of the member(s) from the database, Condition 80a–c defining conditions pertaining to the database operations, and Row 82, Column 84, MaxRows 86 and MaxCols 88 delimiting the rows and columns of the member (s) from the database.

Others of Properties 68, such as Status 90 and Status String 92 pertain to the status of a database action and another, SQMStmt 94, identifies the SQL statement used in a current database action; that is, a user can supply an SQL statement rather than using the normal facilities of Bucket Mechanism 28. Still others of Properties 68, such as Cache Type 96, Cache Duration 98 and Cache Max 100, pertain to caching of the corresponding Bucket Data Object 42 while others, such as Default Member 102 and Default Text 104 are used when the results set display mechanism is some sort of user interface, such as a combination box or a list box, and describe the default database member row to be displayed.

Figure 6:
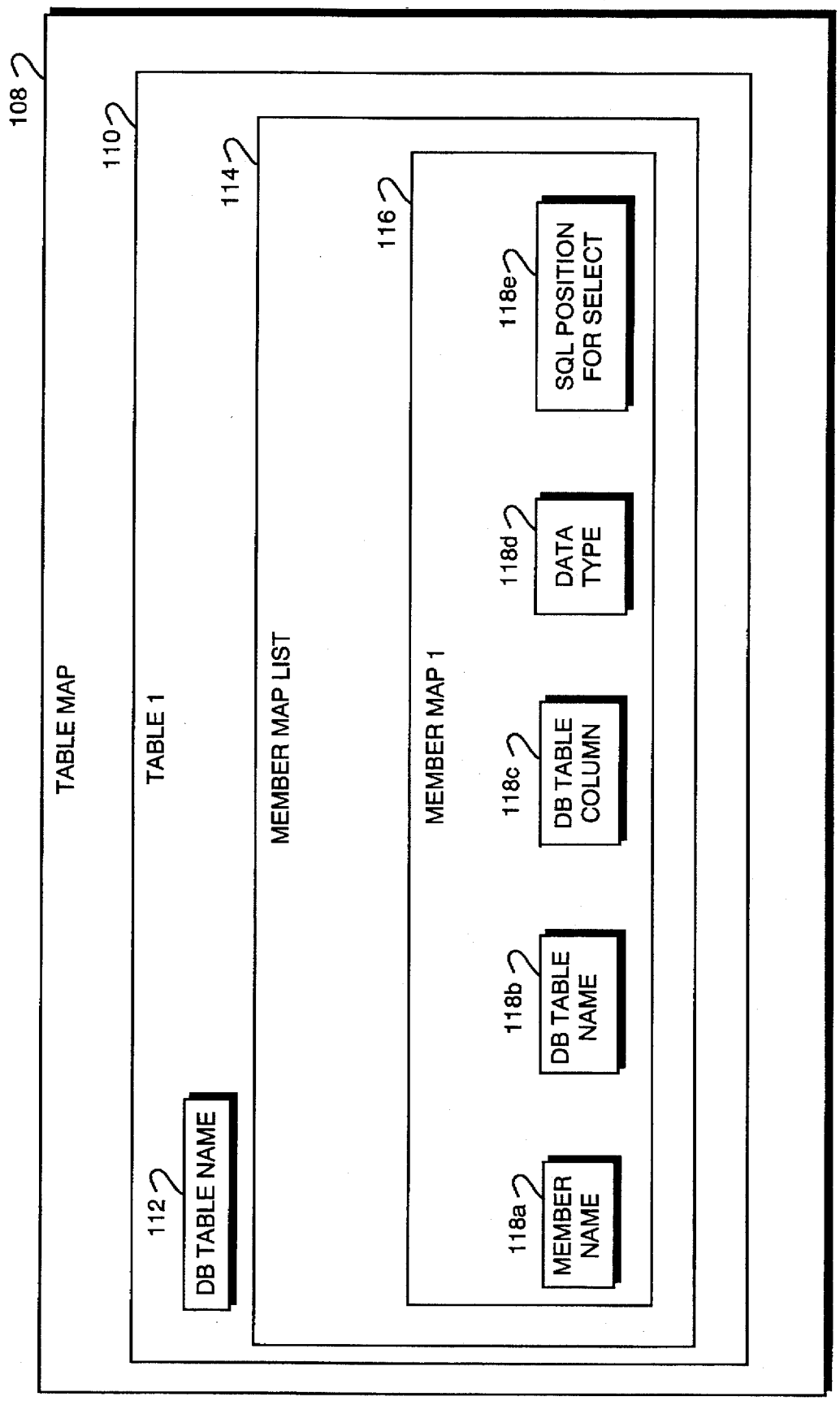
FIG. 6 is a diagrammatic representation of a map table of the present invention; and, FIG. 7 is a diagrammatic representation of a bucket object map of the present invention.
Figure 7:
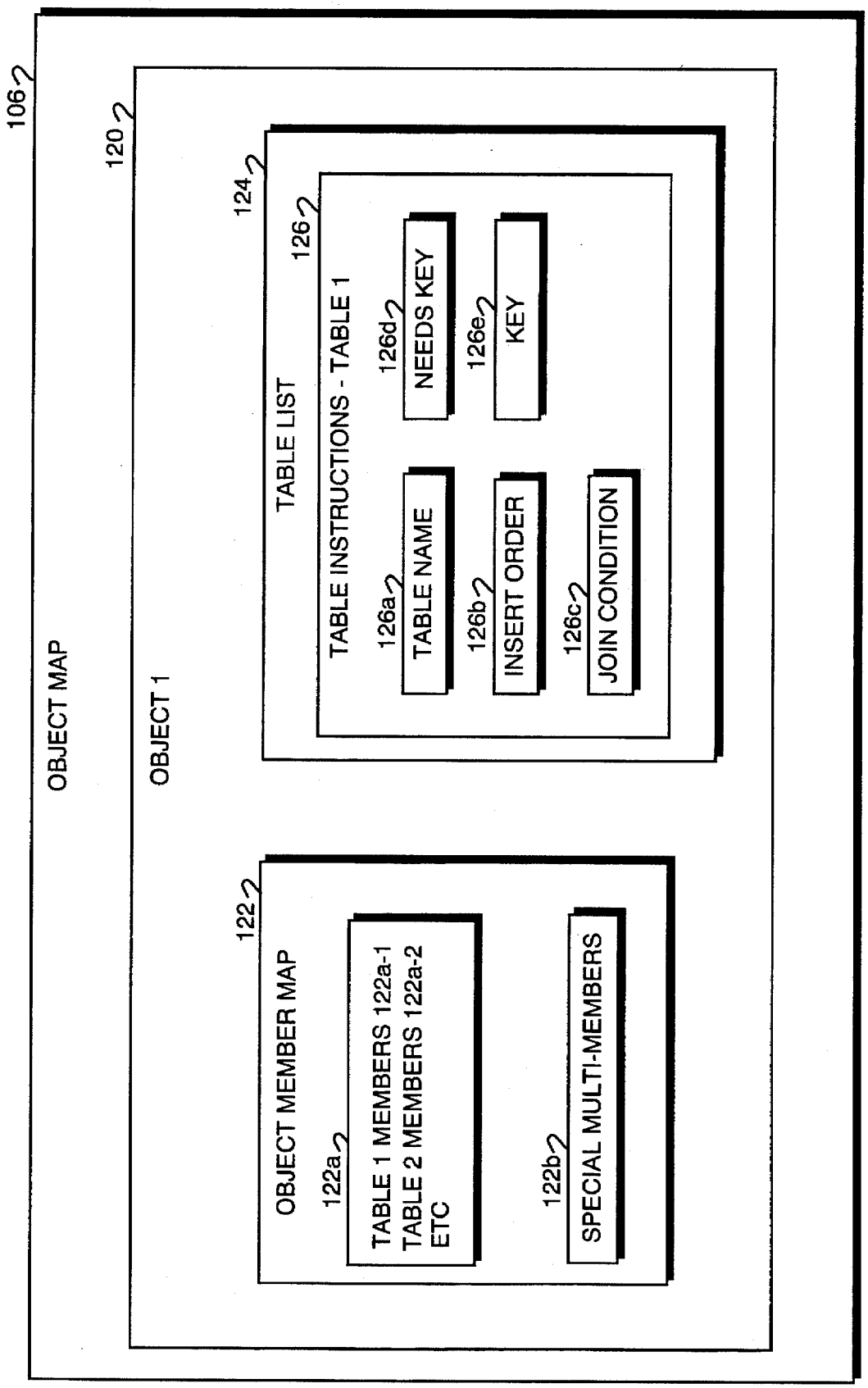

C. Bucket Manager 38 (FIGS. 5, 6 and 7)

As described previously, the function of Bucket Manager 38 is to create Buckets 40 and Bucket Data Objects 42 in response to requests from Application Interfaces 30 and Bucket Manager 38 will create new Buckets 40 or Bucket Data Objects 42 when a new Bucket 40 or Bucket Data Object 42 is necessary to meet the requirements of a particular database request. As also described, the Bucket Mechanism 28 of the present invention stores the information necessary to create Bucket Data Objects 42, and Buckets 40, in a set of map objects, represented as Maps 46 in FIG. 2, which, as illustrated in FIG. 5, are implemented in the present embodiment as an Object Map 106 and a Table Map 108. Object Map 106 and Table Map 108 are constructed by the programmer, rather than by the user of the system, for each Database 20A–n currently known and used by the system and, the information being stored as maps and tables, may be easily modified to add subsequent new databases or data objects to the system.

Figure 5:
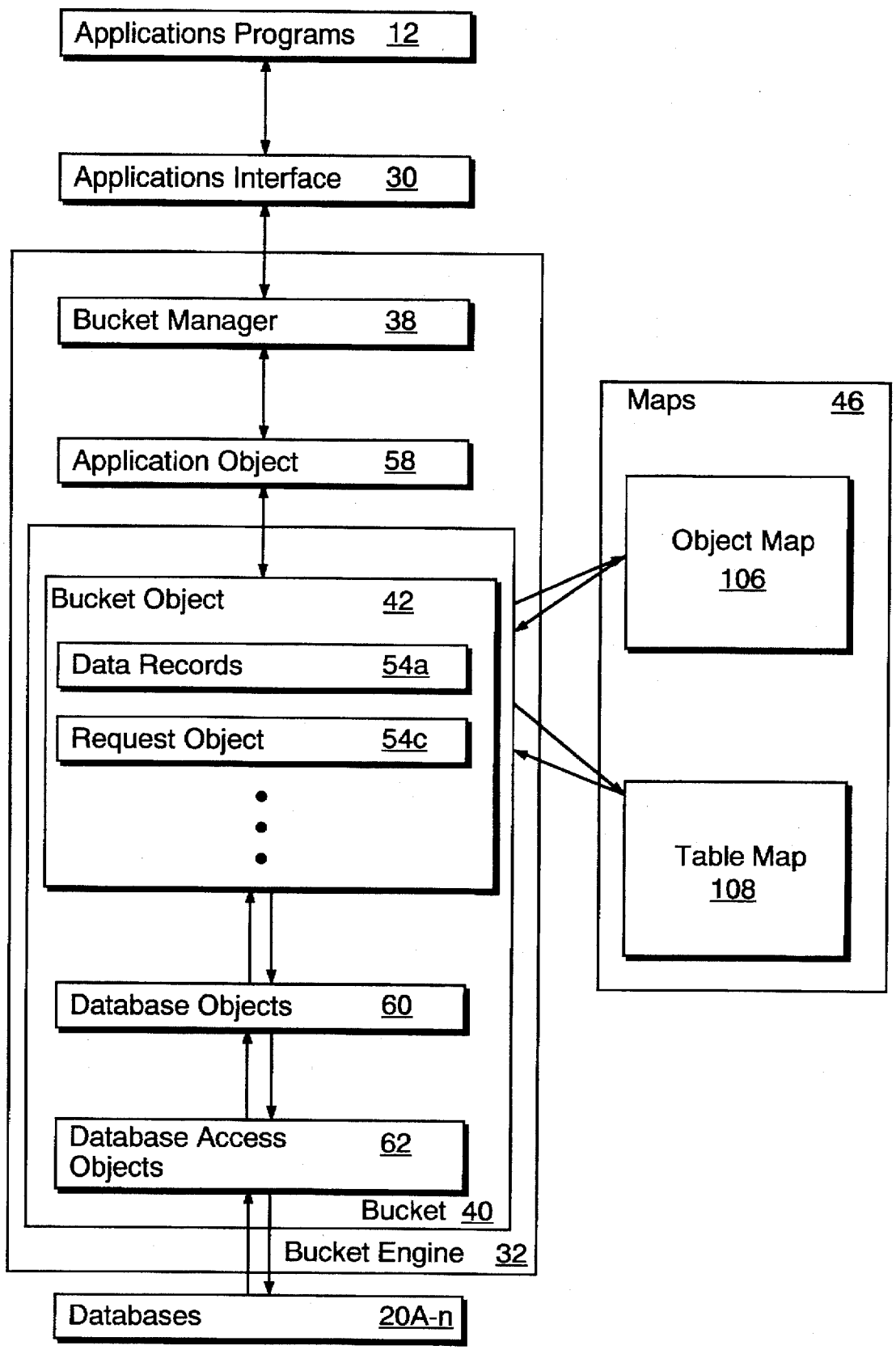
FIG. 5 is a detailed diagrammatic representation of the present invention illustrating the construction of bucket objects.

Referring to FIG. 5, therein is shown a diagrammatic representation of a System 10 incorporating the present invention and with the functional structures and operations of Bucket Engine 32 illustrated in further detail and including the maps and tables used in construction of Bucket Data Objects 42. As has been discussed previously, the Bucket 40 includes a set of Maps 46 containing the information necessary to create Bucket Data Objects 42, the components thereof and elements associated with Bucket Data Objects 42. As shown in FIG. 5, the information contained in Maps 46 resides in Object Map 106 and in Table Map 108. As will be described below, Object Map 106 is essentially a mapping between a Bucket Data Object 42 and the tables of Databases 20 while Table Map 108 is essentially a map relating the Bucket Data Object 42 to the columns of a table of a Database 20.

For example, and referring to the example used through the present descriptions by way of illustration, the request may have originated from Patient Demographics Application Program 20B, so that Bucket Engine 32 would respond by creating a Patient Bucket 40a and a Bucket Data Object 42a and the database members that would appear in the Demographic Bucket Data Object 42 would include the patient's first, middle and last names, address, and so on. Object Map 106 would contain information corresponding to a Demographics Bucket Data Object 42a and Table Map 108 would include information corresponding to each type of patient demographic data.

Referring to FIG. 6, as illustrated therein Table Map 108 includes a Table 110 for and corresponding to each database table contained in Databases 20A–n, wherein each Table 110 includes a Database (DB) Table Name 112 and a Member Map List 114 containing a Member Map 116 for each member of a corresponding Database 20 table containing data that appears in the corresponding Bucket Data Object 42. Each Member Map 116, in turn, includes a Member Name 118a identifying the particular member corresponding to the Member Map 116 and a Database (DB) Table Name 118b identifying the database table containing the member. Each Member Map 116 further includes a Database (DB) Table Column 118c identifying the database column containing the corresponding member, a Data Type 118d identifying the type of data comprising the member, such as numeric or character string, and a SQL Position for Select 118e identifying the location of the member in the identified column.

Referring to FIG. 7, as illustrated therein Object Map 106 is a list that includes an Object 120 for and corresponding to each Bucket Data Object 42 wherein each Object 120 includes an Object Member Map 122 and a Table List 124. Each Object Member Map 122, in turn, contains a Member List 122a that is a concatenated list of all members of the Database 20 included in the Bucket Data Object 42. As indicated, Member List 122a contains entries, indicated as Table Members 122a-1, 122-a-2, and so on, corresponding to and identifying each member of a Database 20 table of the Bucket Data Object 42. Object Member Map 122 may also contain a Special Multi-members List 122b identifying sets of multiple members belonging to the Bucket Data Object 42.

Table List 124, in turn, contains a Table Instructions 126 for and corresponding to each Table 110 included in Table Map 108. As illustrated therein, each Table Instructions 126 includes a Table Name 126a identifying the corresponding table and an Insert Order 126b defining the order in which the tables are inserted into or deleted from membership and a Join Conditions 126c defining how the member tables are to be joined. Each Table Instructions 126 further includes a Needs Key 126d flag that indicates whether a new and unique table identifier is required before a table can be inserted, and a Key 126e that contains the corresponding key, if any.

Referring again to FIG. 5 to consider the operation of Bucket Engine 32, an Applications Program 12, operating though an Application Interfaces 30 issues a call for a database operation, in this example resulting in the creation of a new Bucket Data Object 42. Bucket Manager 38 receives the request through Application Interfaces 30, selects a Bucket 40 corresponding to the Applications Program 12 and requested data, and calls create bucket object methods of the Bucket 40 to create the Bucket Data Object 42.

The create bucket object methods of Bucket 40 access Maps 46 and, in particular, the Object Map 106 corresponding to the type of Bucket Data Object 42 to be created. From that Object Map 106, Bucket Manager 38 identifies and locates the conditions applying to the corresponding type of Bucket Data Object 42, the methods for operating upon and by operations by the corresponding type of Bucket Data Object 42, and the Table Map 108 information to be used in constructing the Bucket Data Object 42.

Bucket Manager 38 then uses this information to construct the Bucket Data Object 42 and the associated Database Objects 52 and Database Access Objects 62. Using these constructs and information, Bucket Manager 38 then accesses Databases 20A–n to obtain the data to appear in the Bucket Data Object 42, through the path comprised of Bucket Data Object 42, Database Objects 52, Database Access Objects 62 and Databases 20A–n and the corresponding return path, as indicated in FIG. 5, and stores the resulting data for the requesting Applications Program 12.

As has been described in the above, subsequent requests pertaining to the same data from other Applications Programs 12 will not result in the construction of a new Bucket Data Object 42, but will be executed by shared access of the Bucket Data Object 42 containing the information.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. For use in a computer system including a processor for performing operations on data and a memory for storing programs for controlling operations of the processor and the data, a bucket mechanism connected between applications programs executing on the computer and a database for providing access to database data by the applications programs and comprising:

an application interface connected between the applications programs and a bucket engine and communicating with the applications programs in their native modes for receiving database queries from the application programs and generating corresponding database access requests to the bucket engine, a bucket engine connected from the application programs and to the databases and being responsive to database requests from the application programs for generating corresponding buckets wherein each bucket corresponds to a class of data members of the databases requested by an application program and includes, a bucket data object for storing data members retrieved from the database, each bucket data object corresponding to a related group of data members retrieved from the database in response to a database request, a database access object for holding and executing database access methods and responsive to a database request for retrieving the requested data member from the database and storing the requested data member in a corresponding bucket data object, and a database object connected between a bucket data object and a database access object for mapping a received database request to a database access method of the database access object and indicating to the database access object the database access method corresponding to the received database request, and an object map and a table map for storing information for use by the bucket engine in constructing buckets and bucket data objects, the table map including a table for and corresponding to a database table, each table including an identification of the corresponding database table, and a member map for each member of the corresponding database table appearing in the bucket data object, each member map including an identification of the member, an identification of the database column containing the member, and an identification of the data type of the member, the object map including an object map object for and corresponding to each bucket data object, each object map object including table list of table instructions for and corresponding to each table appearing in a table of the table map and an object member map, each table instructions including a table name identifying the corresponding table in the table map, an insert order defining the order in which the tables are inserted into or deleted from membership, and join conditions defining how the member tables are joined, and the object member map including a concatenated list of all database members of the bucket data object, wherein the bucket engine is responsive to a database request for accessing the object map and the table map and constructing a corresponding bucket data object and bucket from the information contained in the object map and table map, and wherein the bucket engine is responsive to a database request for providing the requested data member stored in the corresponding bucket data object to the applications programs, and an application object for executing bucket engine operations in response to database requests from a corresponding application program, including initiating a bucket engine database operation for and corresponding to each database request generated by the corresponding application program.

2. A method for use in a computer system including a processor for performing operations on data and a memory for storing programs for controlling operations of the processor and the data for providing access to database data by the applications programs, comprising the steps of:

providing an application interface connected between the applications programs and a bucket engine and communicating with the applications programs in their native modes for receiving database queries from the application programs and generating corresponding database access requests to the bucket engine, by operation of a bucket engine connected from the application programs and to the databases and being responsive to database requests from the application programs, generating corresponding buckets wherein each bucket corresponds to a class of data members of the databases requested by an application program and generating, for each bucket, at least one bucket data object wherein each bucket data object includes, a bucket data object for storing data members retrieved from the database, each bucket data object corresponding to a related group of data members retrieved from the database in response to a database request, generating, for each bucket, a database access object for holding and executing database access methods and responsive to a database request for retrieving the requested data member from the database and storing the requested data member in a corresponding bucket data object, and generating, for each a database object connected between a bucket data object and a database access object for mapping a received database request to a database access method of the database access object and indicating to the database access object the database access method corresponding to the received database request, providing an object map and a table map for storing information for use by the bucket engine in constructing buckets and bucket data objects, the table map including a table for and corresponding to a database table, each table including an identification of the corresponding database table, and a member map for each member of the corresponding database table appearing in the bucket data object, each member map including an identification of the member, an identification of the database column containing the member, and an identification of the data type of the member, the object map including an object map object for and corresponding to each bucket data object, each object map object including table list of table instructions for and corresponding to each table appearing in a table of the table map and an object member map, each table instructions including a table name identifying the corresponding table in the table map, an insert order defining the order in which the tables are inserted into or deleted from membership, and join conditions defining how the member tables are joined, and the object member map including a concatenated list of all database members of the bucket data object, and by operation of the bucket engine and in response to a database request, accessing the object map and the table map and constructing a corresponding bucket data object and bucket from the information contained in the object map and table map, wherein the bucket engine is responsive to a database request for providing the requested data member stored in the corresponding bucket data object to the applications programs, and generating an application object for executing bucket engine operations in response to database requests from a corresponding application program, including initiating a bucket engine database operation for and corresponding to each database request generated by the corresponding application program.

3. For use in a computer system including a general purpose processor for performing operations on data and a memory for storing programs for controlling operations of the general purpose processor and the data, a bucket mechanism connected between applications programs executing on the computer and a database for providing access to database data by the applications programs and comprising:

a plurality of bucket mechanism control programs executing on and controlling operations of the general purpose processor and including a bucket engine connected from the application programs and to the databases and being responsive to database requests from the application programs for generating corresponding buckets wherein each bucket corresponds to a class of data members of the databases requested by an application program and includes, a bucket data object for storing data members retrieved from the database, each bucket data object corresponding to a related group of data members retrieved from the database in response to a database request, a database access object for holding and executing database access methods and responsive to a database request for retrieving the requested data member from the database and storing the requested data member in a corresponding bucket data object, the bucket engine being responsive to a database request for providing the requested data member stored in the corresponding bucket data object to the applications programs.

4. For use in a computer system including a processor for performing operations on data and a memory for storing programs for controlling operations of the processor and the data, a bucket mechanism connected between applications programs executing on the computer and a database for providing access to database data by the applications programs and comprising:

a bucket engine connected from the application programs and to the databases and being responsive to database requests from the application programs for generating corresponding buckets wherein each bucket corresponds to a class of data members of the databases requested by an application program and includes, a bucket data object for storing data members retrieved from the database, each bucket data object corresponding to a related group of data members retrieved from the database in response to a database request, a database access object for holding and executing database access methods and responsive to a database request for retrieving the requested data member from the database and storing the requested data member in a corresponding bucket data object, and a database object connected between a bucket data object and a database access object for mapping a received database request to a database access method of the database access object and indicating to the database access object the database access method corresponding to the received database request, the bucket engine being responsive to a database request for providing the requested data member stored in the corresponding bucket data object to the applications programs.

5. The bucket mechanism of claim 4 wherein the bucket mechanism further includes:

an application interface connected between the applications programs and the bucket engine and communicating with the applications programs in their native modes for receiving database queries from the application programs and generating corresponding database access requests to the bucket engine.

6. The bucket mechanism of claim 4 wherein the bucket engine further comprises:

an application object for executing bucket engine operations in response to database requests from a corresponding application program, including initiating a bucket engine database operation for and corresponding to each database request generated by the corresponding application program.

7. The bucket mechanism of claim 4, further comprising:

an object map and a table map for storing information for use by the bucket engine in constructing buckets and bucket data objects, the table map including a table for and corresponding to a database table, each table including an identification of the corresponding database table, and a member map for each member of the corresponding database table appearing in the bucket data object, each member map including an identification of the member, an identification of the database column containing the member, and an identification of the data type of the member, the object map including an object map object for and corresponding to each bucket data object, each object map object including table list of table instructions for and corresponding to each table appearing in a table of the table map and an object member map, each table instructions including a table name identifying the corresponding table in the table map, an insert order defining the order in which the tables are inserted into or deleted from membership, and join conditions defining how the member tables are joined, and the object member map including a concatenated list of all database members of the bucket data object, the bucket engine being responsive to a database request for accessing the object map and the table map and constructing a corresponding bucket data object and bucket from the information contained in the object map and table map.

8. A method for use in a computer system including a general purpose processor for performing operations on data and a memory for storing programs for controlling operations of the general purpose processor and the data for providing access to database data by the applications programs, comprising the steps of:

providing in the memory a plurality of bucket mechanism control programs executing on and controlling operations of the general purpose processor for performing the steps of the method for providing access to database data by the applications programs, including the steps of by operation of a bucket engine connected from the application programs and to the databases and being responsive to database requests from the application programs, generating corresponding buckets wherein
each bucket corresponds to a class of data members of the databases requested by an application program and
generating, for each bucket, at least one bucket data object wherein each bucket data object includes,
a bucket data object for storing data members retrieved from the database, each bucket data object corresponding to a related group of data members retrieved from the database in response to a database request, and
generating, for each bucket, a database access object for holding and executing database access methods and responsive to a database request for retrieving the requested data member from the database and storing the requested data member in a corresponding bucket data object, wherein
the bucket engine is responsive to a database request for providing the requested data member stored in the corresponding bucket data object to the applications programs.

9. A method for use in a computer system including a processor for performing operations on data and a memory for storing programs for controlling operations of the processor and the data for providing access to database data by the applications programs, comprising the steps of:
by operation of a bucket engine connected from the application programs and to the databases and being responsive to database requests from the application programs,
generating corresponding buckets wherein
each bucket corresponds to a class of data members of the databases requested by an application program and
generating, for each bucket, at least one bucket data object wherein each bucket data object includes,
a bucket data object for storing data members retrieved from the database, each bucket data object corresponding to a related group of data members retrieved from the database in response to a database request,
generating, for each bucket, a database access object for holding and executing database access methods and responsive to a database request for retrieving the requested data member from the database and storing the requested data member in a corresponding bucket data object, and generating, for each a database object connected between a bucket data object and a database access object for mapping a received database request to a database access method of the database access object and indicating to the database access object the database access method corresponding to the received database request, wherein
the bucket engine is responsive to a database request for providing the requested data member stored in the corresponding bucket data object to the applications programs.

10. The method of claim 9, further comprising the step of:
providing an application interface connected between the applications programs and the bucket engine and communicating with the applications programs in their native modes for receiving database queries from the application programs and generating corresponding database access requests to the bucket engine.

11. The method of claim 9, further comprising the step of:
generating an application object for executing bucket engine operations in response to database requests from a corresponding application program, including initiating a bucket engine database operation for and corresponding to each database request generated by the corresponding application program.

12. The method of claim 9, further comprising the steps of:
providing an object map and a table map for storing information for use by the bucket engine in constructing buckets and bucket data objects,
the table map including a table for and corresponding to a database table, each table including
an identification of the corresponding database table, and a member map for each member of the corresponding database table appearing in the bucket data object,
each member map including
an identification of the member,
an identification of the database column containing the member, and
an identification of the data type of the member,
the object map including an object map object for and corresponding to each bucket data object,
each object map object including table list of table instructions for and corresponding to each table appearing in a table of the table map and an object member map,
each table instructions including
a table name identifying the corresponding table in the table map,
an insert order defining the order in which the tables
are inserted into or deleted from membership, and
join conditions defining how the member tables are joined, and
the object member map including a concatenated list of all database members of the bucket data object, and
by operation of the bucket engine and in response to a database request, accessing the object map and the table map and constructing a corresponding bucket data object and bucket from the information contained in the object map and table map.

* * * * *